United States Patent
Xu et al.

(10) Patent No.: US 7,379,428 B2
(45) Date of Patent: May 27, 2008

(54) AUTONOMOUS SYSTEM TOPOLOGY BASED AUXILIARY NETWORK FOR PEER-TO-PEER OVERLAY NETWORK

(75) Inventors: Zhichen Xu, Sunnyvale, CA (US); Mallik Mahalingam, Sunnyvale, CA (US); Magnus Karlsson, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1131 days.

(21) Appl. No.: 10/284,100

(22) Filed: Oct. 31, 2002

(65) Prior Publication Data

US 2004/0085912 A1 May 6, 2004

(51) Int. Cl.
*H04L 12/28* (2006.01)
(52) U.S. Cl. ............ 370/254; 370/400; 370/401; 370/410
(58) Field of Classification Search .......... None
See application file for complete search history.

(56) References Cited

U.S. PATENT DOCUMENTS

| | | | |
|---|---|---|---|
| 6,584,093 B1 * | 6/2003 | Salama et al. ........... 370/351 |
| 6,633,880 B1 * | 10/2003 | Modelski et al. ........... 707/100 |
| 6,658,479 B1 * | 12/2003 | Zaumen et al. ............. 709/238 |
| 6,842,615 B2 * | 1/2005 | Angin ..................... 455/432.1 |
| 6,993,593 B2 * | 1/2006 | Iwata ....................... 709/238 |
| 7,111,074 B2 * | 9/2006 | Basturk .................... 709/241 |
| 7,123,620 B1 * | 10/2006 | Ma ......................... 370/395.32 |
| 7,139,242 B2 * | 11/2006 | Bays ........................ 370/238 |
| 7,180,864 B2 * | 2/2007 | Basu et al. ................ 370/238 |
| 2002/0163884 A1 * | 11/2002 | Peles et al. ................ 370/229 |
| 2003/0072485 A1 * | 4/2003 | Guerin et al. ............. 382/166 |
| 2003/0142682 A1 * | 7/2003 | Bressoud et al. .......... 370/401 |
| 2004/0233859 A1 * | 11/2004 | Martin ..................... 370/254 |

* cited by examiner

*Primary Examiner*—Andrew C. Lee

(57) ABSTRACT

A system and method for an auxiliary network for a peer-to-peer overlay network using autonomous system level topology. Using information available through the auxiliary network, expressway connections are established amongst expressway nodes and ordinary connections are established between ordinary and expressway nodes. The connections established is unconstrained and arbitrary. After the connections are established, efficient routing of information may take place.

24 Claims, 3 Drawing Sheets

CONVENTIONAL ART

AUTONOMOUS SYSTEM TOPOLOGY BASED AUXILIARY NETWORK FOR PEER-TO-PEER OVERLAY NETWORK

RELATED APPLICATIONS

The following applications of the common assignee, incorporated by reference in their entirety, may contain some common disclosure and may relate to the present invention:

U.S. patent application Ser. No. 10/368,426 filed on Feb. 20, 2003, entitled "SUMMARIZING NODES IN ROUTE PROPOGATION IN AUXILIARY NETWORK OR PEER-TO-PEER OVERLAY NETWORKS"; and U.S. patent application Ser. No. 10/284,355, filed on Oct. 31, 2002, entitled "LANDMARK NUMBERING BASED AUXILIARY NETWORK FOR PEER-TO-PEER OVERLAY NETWORKS".

FIELD OF THE INVENTION

This invention relates generally to peer-to-peer ("P2P") overlay networks. In particular, the invention relates generally to auxiliary networks for P2P overlay networks using autonomous system ("AS") topology.

BACKGROUND OF THE INVENTION

Providing scalable and efficient content delivery is becoming more important as the demand for applications such as streaming media grows at an incredible rate. Content Distribution Network ("CDN") and network service providers, advocate using network overlays for providing scalable and robust Internet based applications. Typical overlays are administrator configured, and due to the centralized nature of the overlay construction process, it is not feasible to construct large overlays Recent application-level overlay networks, such as CAN, eCAN, Chord and PAST, are scalable and self-organizing in nature. Nodes in these networks collectively contribute towards a fault-tolerant and administration-free storage space. The basic functionality these systems provide is a distributed hash table ("DHT"). In these systems, an object is associated with a key. Every node in the system is responsible for storing objects whose keys map to the ID of the node (via hashing). Retrieving an object amounts to routing to a node that is responsible for storing that object. The routing path on these overlay networks is at the application-level rather than the IP level.

While elegant from a theoretical perspective, these systems suffer from two major limitations. First, they rely on application-level routing that largely ignores the characteristics of the underlying physical networks. Because the underlying physical characteristics are not taken into consideration, excessive routing delays typically result. Second, they construct a homogeneous structured overlay network, while in reality, the nodes usually have different constraints such as storage, load, packet forwarding capacities and network connections.

In addition, the earlier auxiliary networks are constrained. In other words, the number of connections for a node is fixed or limited. Because of the constraint, the ability to accurately model the underlying physical characteristics is limited as well. Further, the earlier auxiliary networks do not handle the dynamic nature of the nature of the underlying network well. For example, nodes may exit the underlying network and new nodes may enter the network requiring.

SUMMARY OF THE INVENTION

According to an embodiment of the present invention, an autonomous system topology based auxiliary network for a peer-to-peer overlay network may include a plurality of expressway nodes in an autonomous system space, wherein one or more expressway nodes in the autonomous system space are configured to establish a number of expressway connections with one or more other expressway nodes such that a number of established expressway connections is arbitrary for each of the one or more expressway nodes. The auxiliary network may also include a plurality of ordinary nodes in the autonomous system space, wherein one or more ordinary nodes in the autonomous system space are configured to establish a number of ordinary connections with the one or more expressway nodes.

According to another embodiment of the present invention, a method to construct an autonomous system topology based auxiliary network for a peer-to-peer overlay network may include establishing expressway connections in an autonomous system space between one or more expressway nodes and one or more other expressway nodes such that a number of established expressway connections is arbitrary for each of the one or more expressway nodes. The method may also include establishing ordinary connections between one or more ordinary nodes and the one or more expressway nodes.

BRIEF DESCRIPTION OF THE DRAWINGS

Features of the present invention will become apparent to those skilled in the art from the following description with reference to the drawings, in which.

DETAILED DESCRIPTION

For simplicity and illustrative purposes, the principles of the present invention are described by referring mainly to exemplary embodiments thereof. However, it is to be understood that the same principles are equally applicable to many types of auxiliary network for peer-to-peer overlay networks.

In an embodiment of the present invention, an existing overlay network, such as CAN, eCAN, Tapestry, Chord, Pastry, and the like, may be augmented with an auxiliary network to improve performance (for example, routing performance). The auxiliary network, also termed expressway network, allows the heterogenic conditions, i.e. characteristics of the underlying physical networks, to be exploited. In the expressway network, heterogenic conditions such as physical proximity, forwarding capacity and connectivity of the nodes of the network are taken into account. Also, unlike the previous networks, the expressway network may be unconstrained.

As mentioned above, examples of overlay networks are CAN, eCAN, Pastry, and Chord. With CAN, the problem of data placement/retrieval over large-scale storage systems is abstracted as hashing that maps keys onto values. CAN organizes the logical space as a d-dimensional Cartesian space (a d-torus). The Cartesian space is partitioned into zones, with one or more nodes serving as owner(s) of the zone. An object key is a point in the space, and the node owns the object. Routing from a source node to a destination node boils down to routing from one zone to another in the Cartesian space. Node addition corresponds to picking a random point in the Cartesian space, routing to the zone that contains the point, and splitting the zone with its current owner(s). Node removal amounts to having the owner(s) of one of the neighboring zone take over the zone owned by the departing node. In CAN, two zones are neighbors if they overlap in all but one dimension along which they neighbor each other.

eCAN augments CAN's routing capacity with routing tables of larger span. Every k CAN zones represent an order-1 zone, and k order-i zones represents an order-i+1 zone. The variable k is called the zone coverage factor. As a result, a node is an owner of a CAN zone and is also resident of the high-order zones that encompass the CAN zone. Besides its default routing neighbors that are CAN zones, a node also has high-order routing neighbors that are representatives of its neighbors in the high-order zones. eCAN provides flexibility in selecting the high-order neighbors. When selecting a representative for a high-order neighbor, a node may be selected that is closest to the current node amongst all the nodes that belong to the neighboring high-order zone.

Figure 1:
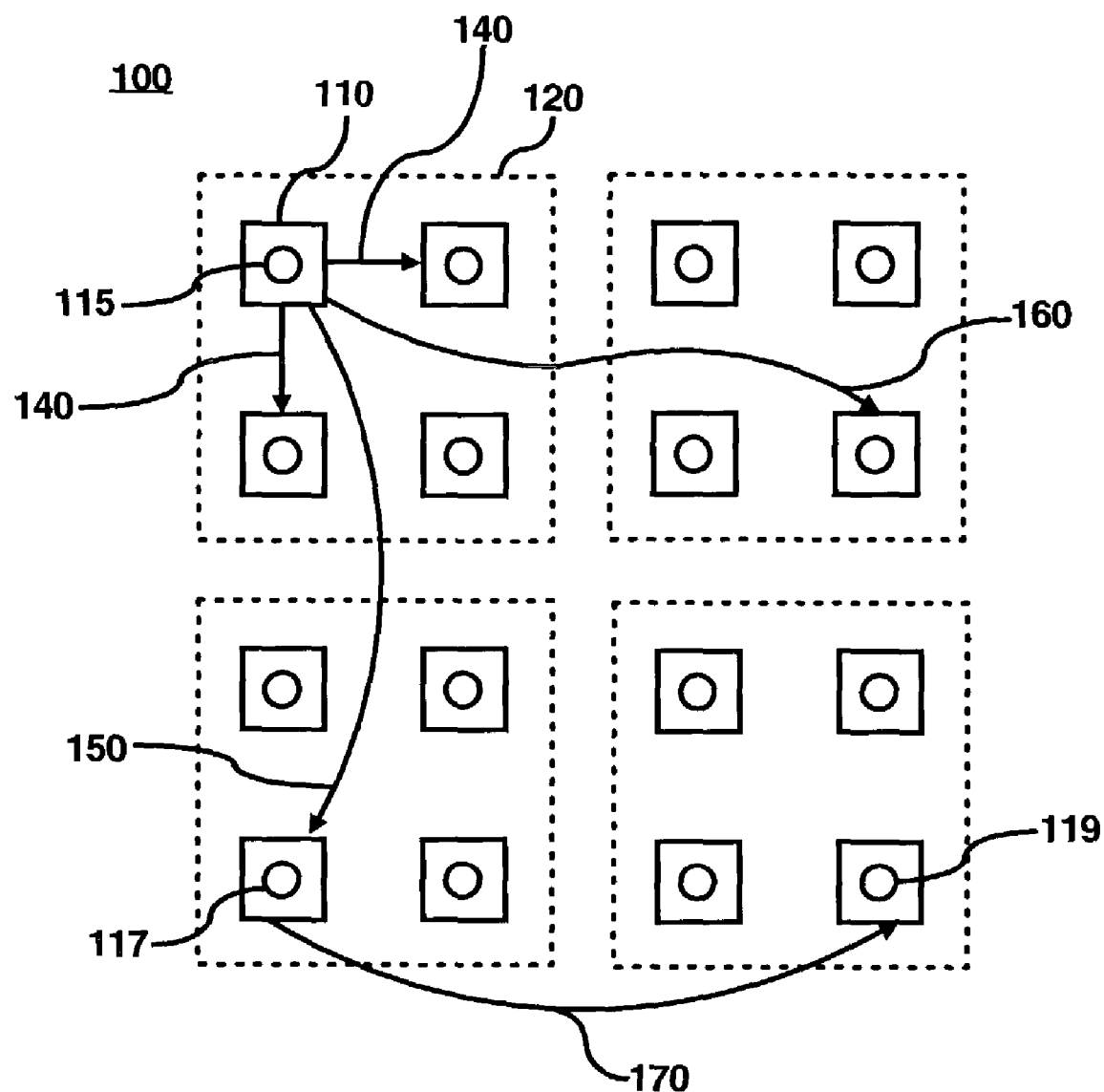
FIG. 1 is an exemplary diagram illustrating a conventional eCAN overlay network.

FIG. 1 illustrates an exemplary eCAN 100. The eCAN 100 includes default CAN zones 110, and in this example, each default CAN zone 110 is 1/16 of the entire Cartesian space. Also, four neighboring default zones 110 make one order-2 eCAN zone 120. Thus, in this example, there are sixteen default zones 110 and four order-2 zones 120. While not shown, the neighboring order-2 zones may be used to construct order-3 zones, order-3 zones used to construct order-4 zones, and so on.

In addition, a node may own a particular default CAN zone. In this instance, the node 115 owns the CAN zone 110 in the upper left. In addition, a node is a resident of the higher order zones that encompass the particular default zone. The routing table of node 115 includes a default routing information of CAN (represented as arrows 140) that link only to the immediate neighbors of node 115. The routing table also includes high-order routing information (represented as arrows 150 and 160) that link to nodes of neighboring eCAN zones 120 and 130. In this example, node 115 may reach node 119 using eCAN routing (115, 117, 119).

In an embodiment of the present invention, using an auxiliary network like the expressway network, the heterogeneity of nodes may be represented without altering the overlay network like CAN and eCAN. In other words, the characteristics of the underlying physical network may be taken into consideration. However, it should be noted that the expressway network may be used to augment many types overlay networks and is not limited to CAN and eCAN.

In the expressway network, each node may establish connections to nodes in its physical proximity that are well-connected and have good forwarding capacities. For example, routers and gateways and the nodes that are near the routers and gateways are better suited to forward packets. Forwarding capacities typically refers to network bandwidth and packet processing abilities. These well-connected nodes are called expressway nodes. The expressway nodes themselves may be linked to other expressway nodes that are close by called expressway neighbors to form an expressway.

The expressway may be used to route information in the network. Note that the number of expressway links from a particular expressway node to other expressway nodes is unconstrained. In other words, the number of expressway links established by each expressway node is arbitrary and perhaps different for each expressway node.

For a given default overlay network such as eCAN, a corresponding expressway network may be constructed in many different ways. When constructing the expressway network, expressway nodes are selected. The expressway nodes form connections between themselves to form expressways. While not exhaustive, the expressway nodes typically may serve the following purposes: (1) to propagate routing information when nodes join or leave or when the network conditions change; (2) to resolve the routing destinations; and (3) to forward information packets for multicasting or for better IP routing performance.

In an embodiment of the present invention, autonomous system topology information may be used to form the expressways. An autonomous system (or AS) may be viewed as a network or a group of networks under a common administration with a common set of routing policies. For example, a network within a particular AS may employ Interior Gateway Protocol ("IGP") such as Routing Information Protocol ("RIP") and Open Shortest Path First ("OSPF") to exchange routing information.

However, for communications between autonomous systems, Border Gateway Protocol ("BGP") is typically used. As an example, BGP is the routing protocol employed on the Internet allowing routing information to be shared among many autonomous systems.

Each autonomous system is identified by its AS identifier, and nodes (such as routers, servers and the like) belong to a particular AS. Note that AS identifiers may serve as a position indicator of the AS in an AS topology. This is because the inter-AS routing protocols, such as BGP, maintain "optimum" routing information for communication between autonomous systems. Typically, "optimum" is defined in terms of routing performance—i.e. to minimize overall latency. In this scenario, a particular AS is far from another AS if the latency between them is relatively large. Conversely, they are near to each other if the latency between is relatively small. Thus, based on the position indicator within the AS topology, it can be easily determined which other autonomous systems are topological neighbors of a particular AS.

In the expressway network utilizing AS topology, a new node joining the expressway may first determine to which AS it belongs. For example, the new node may map its IP address to an AS identifier using BGP information. After determining the AS, the new node may publish information about itself. The information may include its IP address, its logical ID (such as its ID within the default overlay network), and whether the new node is an expressway node.

This published information may be kept in the default overlay itself. For example, the information may be in a hash table with the node's AS identifier as the key. An advantage is that the global state published on the default overlay does not need to be kept consistent since the correctness of routing is not affected.

If the new node is an ordinary node, the new node may use the ID of its AS to retrieve information on all other nodes in the same AS. Then the new ordinary node may establish direct connection with the other nodes in the same AS by adding them as its neighbors. The new ordinary node may also notify the neighbors so that the neighbors will add the new ordinary node to their neighbor set.

A particular way to accomplish this scheme is through caching. For example, an ordinary node may always find the closest expressway node and establish communication with the expressway node. So the first time the ordinary node wishes to communicate with a destination ordinary node, the ordinary node may establish connection with the closest expressway node to cache the destination node's information. From then on, the ordinary may communicate directly with the destination node.

If the new node is an expressway node, the new expressway node may obtain a list of other expressway nodes that are its topological neighbors. This may be accomplished by using the AS identifiers of the neighboring autonomous systems as hash keys. After the list is obtained, the new expressway node may establish direct connections with the other expressway nodes. The other expressway nodes may become part of an expressway neighbor set of the new expressway node. Similarly, the other expressway neighbors may add the new expressway node to their respective set of expressway neighbors.

Note that when an expressway node leaves the system, it may notify its expressway neighbors. In this manner, information regarding expressway neighbors may be maintained accurately.

Figure 2:
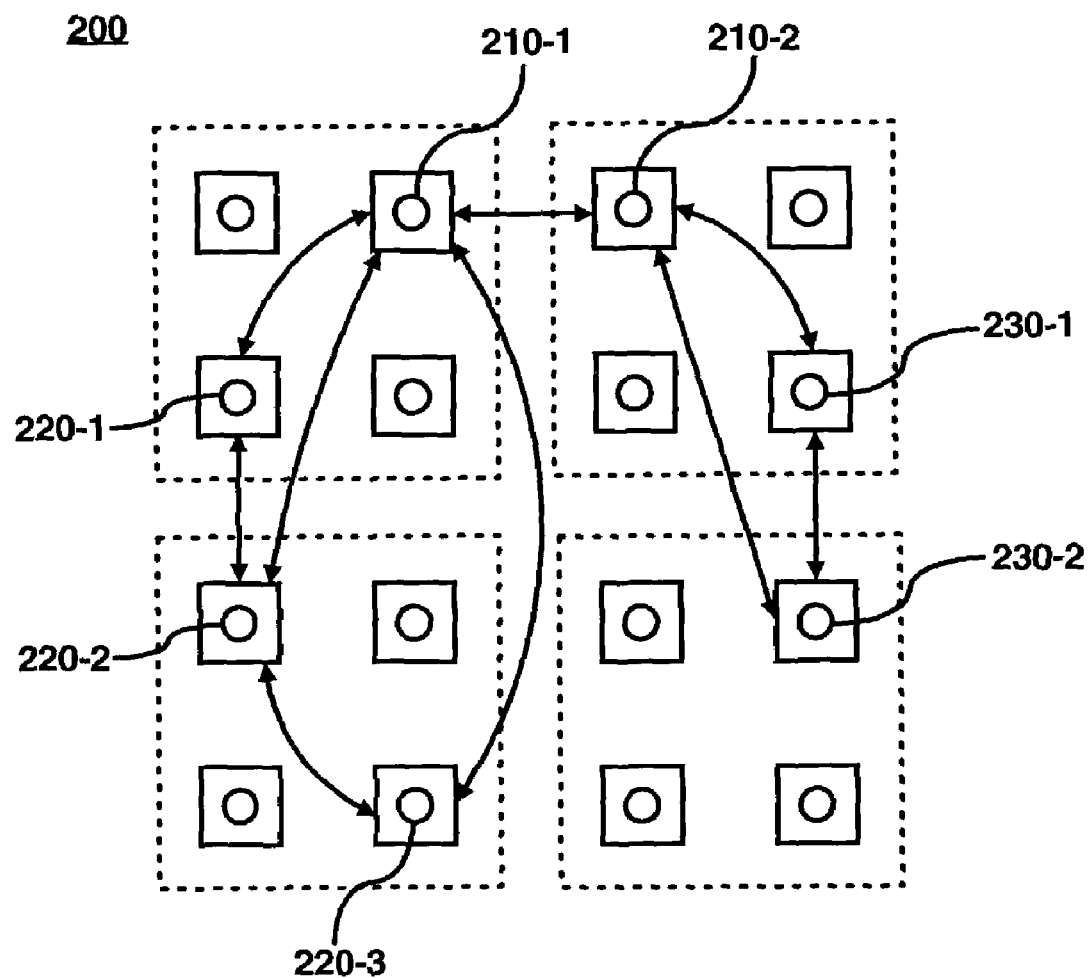
FIG. 2 is an exemplary diagram illustrating the use of autonomous system topology to select expressway neighbors in a default overlay according to an embodiment of the present invention.

FIG. 2 illustrates a diagram 200 illustrating the use of AS topology to select expressway neighbors in a default overlay, for example eCAN. The diagram includes expressway nodes 210-1 and 210-2. The diagram 200 also includes ordinary nodes 220-1, 220-2 and 220-3. These nodes all belong to the same AS as the expressway node 210-1. In addition, the diagram 200 also includes ordinary nodes 230-1 and 230-2 which belong to the same AS as the expressway node 210-2.

Note that the expressway nodes establish an expressway connection between themselves to form the expressway. Also, all ordinary nodes establish connections with expressway nodes in their proximity. Further, each node of an AS establishes connections with other nodes in the same AS.

The intuition behind this formulation is that the nodes that are close to each other will have the same AS identifier. Also, when forming expressway connection between expressway nodes, the BGP information may be used to determine its proximity to other expressway nodes. The expressway connections may be established based on the proximity information contained within BGP or any other inter-AS communication protocols. As noted previously, the proximity information may be determined by number of AS hops (the number of AS a packet has to traverse).

While not exhaustive, the following are some example criteria that determines when a particular expressway node may establish an expressway connection with one or more other expressway nodes. One example is that the particular expressway node may establish expressway connections with a pre-determined number of the closest other expressway nodes. Note that the pre-determined number may be one. Also note that the pre-determined number may be different for each expressway node, i.e. is arbitrary. Another example is that the particular expressway node may establish expressway connections with all other expressway nodes that are within a pre-determined latency as measured from the particular expressway node's perspective.

Indeed, the criteria may be a combination. For example, an expressway node may always establish a pre-determined minimum number of connections, but may also establish connections with all other expressway nodes within a pre-determined latency.

Similarly, an ordinary node may determine its proximity to expressway nodes based on the AS identifiers of the expressway nodes, which can be viewed as a measure of proximities of the expressway nodes. Based on the proximity information, each ordinary node may establish ordinary connections with expressway nodes in a similar manner as described above. The criteria used establish the ordinary connections may be individualized for each ordinary node.

Figure 3:
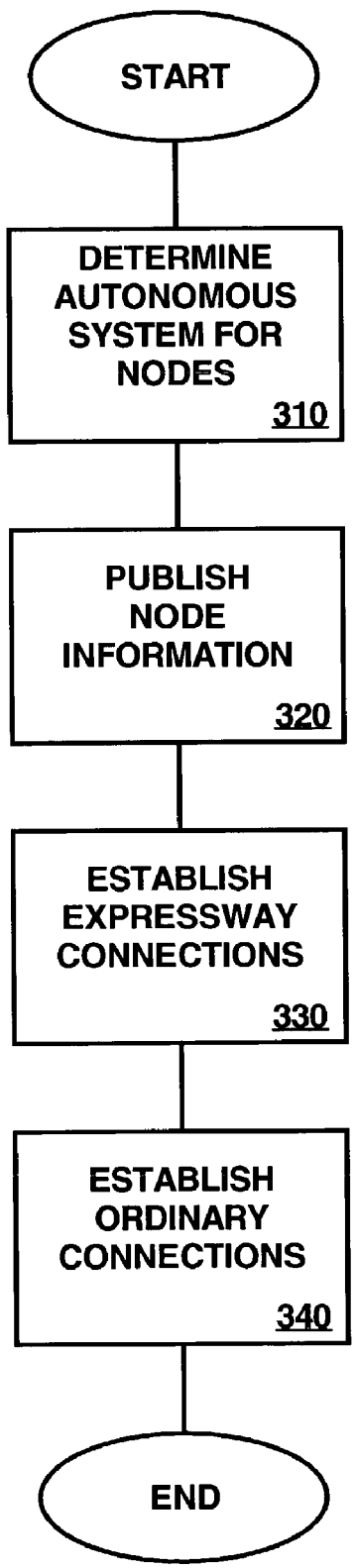
FIG. 3 is a graph illustrating an exemplary method to construct an expressway using autonomous system topology according to an embodiment of the present invention.

FIG. 3 is a graph illustrating an exemplary method 300 to construct an expressway using AS topology according to an embodiment of the present invention. As shown, the method 300 includes determining for each node (expressway or ordinary) which autonomous system the node belongs to (step 310) and publishing information regarding the nodes (step 20). The method 300 also includes establishing expressway connections amongst the expressway nodes based on the published information. The method 300 further includes establishing ordinary connections between ordinary nodes and other ordinary nodes and expressway nodes (step 340).

As described and shown, AS topologies may be used to construct an expressway. With the expressway, routing performance may be improved since the proximity information regarding node positions are taken into consideration.

In an embodiment of the present invention, the routing state may be summarized to maintain the amount of routing information at a reasonable level. For example, the entire d-dimension Cartesian space may be divided into a plurality of grids of equal size. When a node joins an expressway, it may advertise its position relative to the grid falls into instead of advertising its position directly. In this manner, the amount of routing information may be minimized, i.e. the routing table size may be maintained at a smaller size. However, the trade off is lesser routing performance.

While the invention has been described with reference to the exemplary embodiments thereof, it is to be understood that various modifications may be made to the described embodiments of the invention without departing from the spirit and scope of the invention. The terms and descriptions used herein are set forth by way of illustration only and are not meant as limitations. In particular, although the methods of the present invention has been described by examples, the steps of the method may be performed in a different order than illustrated or may be performed simultaneously. These and other variations are possible within the spirit and scope of the invention as defined in the following claims and their equivalents.

The invention claimed is:

1. An autonomous system topology based auxiliary network augmenting a peer-to-peer (P2P) overlay network having a plurality of peer nodes, comprising:
   a plurality of autonomous system spaces, each wherein a distinct subset of the plurality of peer nodes belongs to each of the plurality of autonomous system spaces, and the P2P overlay network overlays the plurality of autonomous system spaces;
   an expressway node in each of the autonomous system spaces, the expressway node is one of the peer nodes in the each autonomous system space chosen based on one of its forwarding capacities and connections with one or more other peer nodes in accordance with characteristics of at least one physical network underlying the P2P overlay network;

wherein a first one of the expressway nodes in a first one of the plurality of autonomous system spaces is configured to establish an expressway connection with a second one of the expressway nodes in a second one of the plurality of autonomous system spaces to route information between the first and second autonomous system spaces; and at least one ordinary node in each of the plurality of autonomous system spaces, wherein the one ordinary node in the first autonomous system space is configured to establish an ordinary connection with the the first expressway node to route information from the first autonomous system space to the second autonomous system space via the first and second expressway nodes.

2. The auxiliary network of claim 1, wherein the number of expressway connections are established based on respective autonomous system identifiers of the one or more expressway nodes and the one or more other expressway nodes.

3. The auxiliary network of claim 2, wherein each of the one or more expressway nodes is configured to publish information of itself over the P2P overlay network, and the P2P overlay network is one of a content addressable network (CAN), an express CAN (eCAN), a Tapestry network, a Chord network, and a Pastry network.

4. The auxiliary network of claim 3, wherein each of the expressway nodes is configured to map its Internet Protocol (IP) address so the respective autonomous system identifier based on Border Gateway Protocol.

5. The auxiliary network of claim 3, wherein the information published for at least one of the expressway nodes includes at least one of an IP address, a logical ID within the P2P overlay network, and an indication of being an expressway node.

6. The auxiliary network of claim 5, wherein the published information is resident within the P2P overlay network.

7. The auxiliary network of claim 3, wherein at least one of the expressway nodes is configured to:
    obtaining a list of topologically neigboring expressway nodes; and
    establishing the number of expressway connections with the topologically neighboring expressway nodes.

8. The auxiliary network of claim 7, wherein the list of topologically neighboring expressway nodes is obtained based on autonomous system identifiers of the neighboring autonomous systems as hash keys in a hash table of the P2P overlay network.

9. The auxiliary network of claim 7, wherein each of the expressway nodes is configured to perform at least one of:
    adding an entering expressway node to its list of topologically neighboring expressway nodes as a result of an expressway connection being established with the entering expressway node; and
    deleting an exiting expressway node from its list of topologically neighboring expressway nodes.

10. The auxiliary network of claim 1, wherein each of the ordinary nodes is configured to:
    obtaining a list of neighboring expressway and ordinary nodes in the same autonomous system as itself; and
    establishing the number of ordinary connections with the neighboring expressway and ordinary nodes.

11. The auxiliary network of claim 10, wherein each of the one or more ordinary nodes is configured to cache connection information of the neighboring expressway and ordinary nodes.

12. The auxiliary network of claim 1, wherein the number of established ordinary connections is arbitrary for each of the one or more ordinary nodes.

13. A method to construct an autonomous system (AS) topology based auxiliary network for augmenting a peer-to-peer (P2P) overlay network having a plurality of peer nodes, the method comprising:
    establishing a plurality of AS spaces;
    overlaying the P2P overlay network over the plurality of AS spaces such that each of the plurality of AS spaces includes a distinct subset of the plurality of peer nodes;
    selecting one of the peer nodes in each of the AS spaces as an expressway node based on one of its forwarding capacities and connections with one or more other peer nodes in accordance with characteristics of at least one physical network underlying the P2P overlay network;
    designating the remaining peer nodes in each of the plurality of AS spaces as ordinary nodes;
    establishing one or more expressway connections between each of the expressway nodes in each of the AS spaces and one or more of the other expressway nodes in the other AS spaces; and
    establishing ordinary connections between one or more ordinary nodes in the each AS space and the expressway node in the each AS space such that a first one of the ordinary nodes in a first one of the AS spaces is configured to route information to a second one of the ordinary nodes in the second one of the AS spaces via expressway nodes in the first and second AS spaces.

14. The method of claim 13, wherein the established one or more expressway connections for each of the expressway nodes are based on respective autonomous system identifiers of the each expressway node and the one or more other expressway nodes associated with the established one or more expressway connections.

15. The method of claim 14, further comprising publishing information of each of the expressway nodes over the P2P overlay network, and the P2P overlay network is one of a content addressable network (CAN), an express CAN (eCAN), a Tapestry network, a Chord network, and a Pastry network.

16. The method of claim 15, wherein the step of establishing one or more expressway connections includes mapping an Internet Protocol (IP) address of the each expressway node to the respective autonomous system identifier based on Border Gateway Protocol.

17. The method of claim 15, wherein the information published for each of the expressway nodes includes at least one of an IP address, a logical ID within the P2P overlay network, and an indication of being an expressway node.

18. The method of claim 17, further comprising maintaining the published information of each of the expressway nodes within the P2P overlay network.

19. The method of claim 15, wherein the step of establishing one or more expressway connections includes:
    obtaining a list of topologically neighboring expressway nodes for each of the expressway nodes; and
    establishing one or more expressway connections with the topologically neighboring expressway nodes for each of the expressway nodes.

20. The method of claim 19, wherein the step of obtaining the list of topologically neighboring expressway nodes includes retrieving information in a hash table of the P2P overlay network based on autonomous system identifiers of the neighboring autonomous systems as hash keys in the hash table.

21. The method of claim 19, further comprising at least one of:
   adding an entering expressway node to a list of topologically neighboring expressway nodes of one of the expressway nodes as a result of an expressway connection being established between the entering expressway node and the one expressway node; and
   deleting an exiting expressway node from the list of topologically neighboring expressway nodes of the one expressway node.

22. The method of claim 13, wherein the step of establishing the ordinary connections include:
   obtaining a list of neighboring expressway and ordinary nodes in the same autonomous system for each of the one or more ordinary nodes in each of the AS space; and
   establishing a number of ordinary connections with the neighboring expressway and ordinary nodes for the each ordinary nodes.

23. The method of claim 22, further comprising caching connection information of the neighboring expressway and ordinary nodes.

24. The method claim 13, wherein a number of established ordinary connections is arbitrary for each of the one or more ordinary nodes.

* * * * *

UNITED STATES PATENT AND TRADEMARK OFFICE
CERTIFICATE OF CORRECTION

PATENT NO.         : 7,379,428 B2                                Page 1 of 1
APPLICATION NO.    : 10/284100
DATED              : May 27, 2008
INVENTOR(S)        : Zhichen Xu et al.

It is certified that error appears in the above-identified patent and that said Letters Patent is hereby corrected as shown below:

In column 7, line 11, in Claim 1, after "with the" delete "the".

In column 7, line 29, in Claim 4, after "address" delete "so" and insert -- to --, therefor.

In column 7, line 41, in Claim 7, delete "neigboring" and insert -- neighboring --, therefor.

In column 10, line 10, in Claim 24, after "method" insert -- of --.

Signed and Sealed this

Twenty-seventh Day of January, 2009

JOHN DOLL
*Acting Director of the United States Patent and Trademark Office*